April 22, 1941.  L. A. GAMMILL  2,239,092
MILK BOTTLE
Filed Feb. 7, 1940

Inventor
Leland A. Gammill

By Clarence A. O'Brien
and Hyman Berman
Attorneys

Patented Apr. 22, 1941

2,239,092

UNITED STATES PATENT OFFICE 2,239,092

MILK BOTTLE

Leland A. Gammill, Santa Barbara, Calif.

Application February 7, 1940, Serial No. 317,750

2 Claims. (Cl. 215—31)

This invention relates to a milk bottle wherein the exterior shape or design may be of any well known kind, while the interior construction is an improvement over conventionally constructed milk bottles in that the cream which rises to the upper portion of the bottle on the milk may be conveniently poured from the bottle without any of the milk leaving the bottle along with the cream so that a person may easily obtain the cream without it being diluted with milk.

With these and other objects in view, the invention consists in certain novel features of construction, combination and arrangement of parts to be hereinafter more fully described and claimed.

For a complete understanding of my invention, reference is to be had to the following description and accompanying drawing, in which Figure 1 is a sectional view taken on the line 1—1 of Figure 2 illustrating a milk bottle constructed in accordance with my invention.

Figure 1:
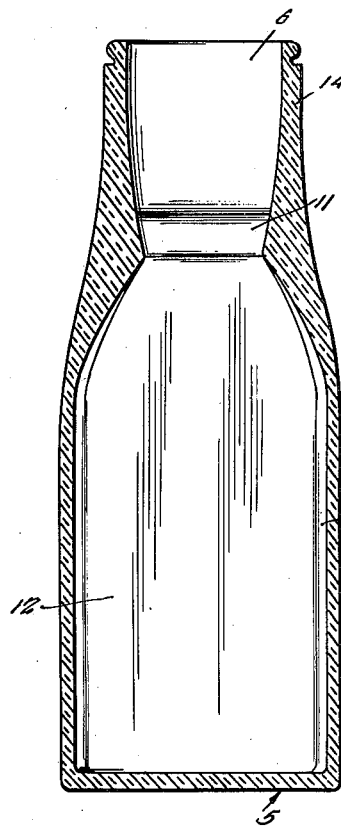

Referring in detail to the drawing, the numeral 5 indicates a milk bottle constructed from any material suitable for the purpose and has any desired exterior shape. The interior construction of the bottle is made in accordance with the present invention wherein upper and lower chambers 6 and 7 are provided with a restricted inclined passage 8 connecting said chambers. Opposite walls of the bottle are thickened to provide portions 9 and 10 which coact to separate the chambers 6 and 7 except for the passage 8 and in the forming of said passage. The portion 10 is of elongated formation and extends from the bottom wall of the bottle upwardly to a point past the mid-section of the bottle and has an upwardly and outwardly inclined face 11 at the upper end thereof which forms one wall of the passage 8 while the remaining portion of the enlargement 10 has a vertical straight face 12. A shoulder 13 is formed by the meeting of the faces 11 and 12 which terminates at one side wall of the passage 8 where the latter communicates with the chamber 7.

The upper end of the face 11 merges into a wall of the neck 14 of the bottle.

Figure 5:
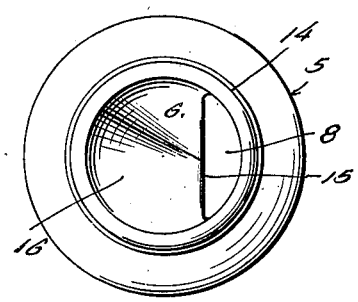
Figure 5 is a top plan view illustrating the bottle.

The portion 9 extends from the end of the neck 14 into the chamber 7 with its medial part of the greatest thickness to define a shoulder 15 lying opposite the face 11 where the latter merges into the neck to cooperate therewith in forming one end of the passage 8 which communicates with the chamber 6. The shoulder 15 while in a plane above the shoulder 13 overlays the shoulder 13 to a slight extent. The portion 9 has a concave face 16 which merges into the walls of the neck 14 and extends from the shoulder 15 to the open end of said neck and lies wholly within the chamber 6. The portion 9 is further provided with an upwardly and inwardly inclined face 17 extending from the shoulder 15 to one of the vertical walls of the bottle within the chamber 7. A part of the face 17 coacts with the face 11 of the portion 10 and certain vertical walls of the bottle in forming the passage 8, the upper end of which is shaped, as shown in Figure 5. The face 17 besides inclining as specified has a slight arcuate curvature transversely thereof so as to merge gradually into certain opposite vertical walls of the bottle.

Figure 2:
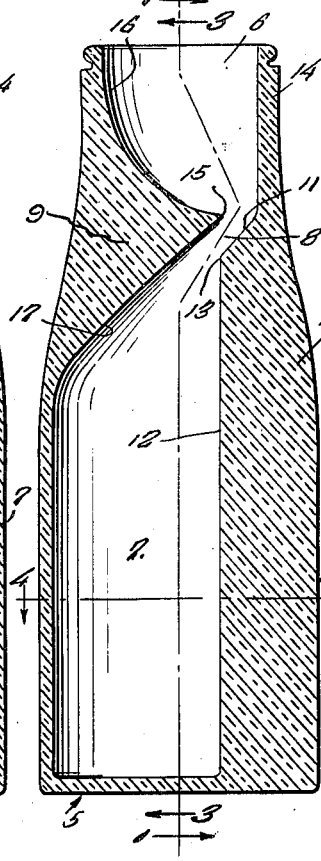
Figure 2 is a vertical sectional view illustrating the interior construction of the milk bottle as having upper and lower chambers connected by a restricted passage.
Figure 3:
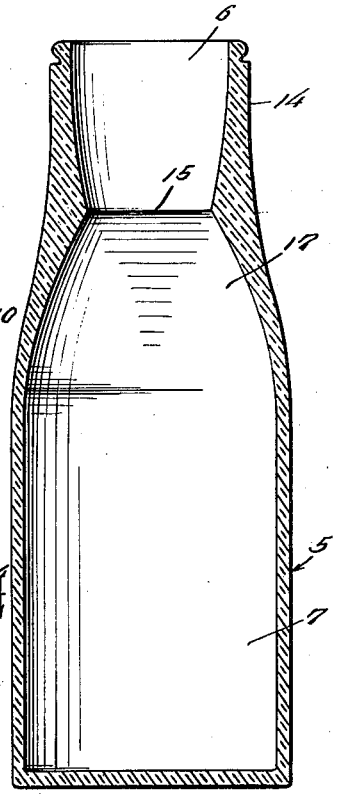
Figure 3 is a sectional view taken on the line 3—3 of Figure 2.
Figure 4:
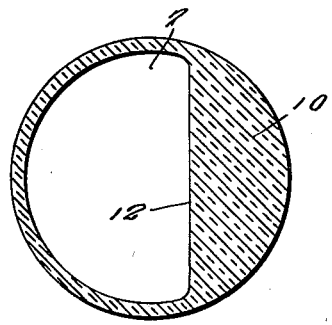
Figure 4 is a sectional view taken on the line 4—4 of Figure 2.

When milk containing cream is placed in the bottle of the construction heretofore described in detail and shown in the drawing, the milk and cream gradually will separate as usual when left to stand. The milk remains in the chamber 7 and the cream rises on the milk and reaches the chamber 6 by way of the passage 8. The cream may then be poured from the chamber 6 by tilting the bottle towards a horizontal position and to the left, as shown in Figure 2, so that the cream leaving the chamber 6 flows over the face 16 and the face 17 and shoulder 15 act to check the milk from flowing into the chamber 6 and thereby prevent the milk from flowing out of the bottle during the removal of the cream from the bottle. After the removal of the cream as specified, the milk may be readily poured from the bottle by tilting the latter to the right in Figure 2.

A major portion of the chamber 7 is semicircular shaped in cross section caused by the walls of the bottle and the face 12 of the portion 10, while the remaining portion of the chamber 7 is substantially funnel-shaped leading into the passage 8.

A bottle of the construction described will permit cream to readily rise on milk and enter a separate chamber from the chamber containing the milk so that due to the construction of the passage and the chamber containing the cream, the cream may be poured from the bottle free of any milk.

It is believed that the foregoing description, when taken in connection with the drawing, will fully set forth the construction and advantages of this invention to those skilled in the art to which such a device relates, so that further description will not be required.

Having thus described my invention, what I claim is:

1. A milk bottle including a body and neck defined by a bottom wall and vertical walls, an enlargement formed on certain of said vertical walls interiorly of the body and a portion of the neck, a second enlargement formed on other walls of the body and neck to coact with the first-named enlargement in defining upper and lower chambers connected by an upwardly inclined passage, said first-mentioned enlargement having a vertical face and an upwardly and outwardly inclined face, said faces merging in defining a shoulder at the lower end of the neck, said second-mentioned enlargement having an upwardly and inwardly inclined face and a concave face, said faces of the second-named enlargement merging with each other to define a second shoulder located in a plane above the first shoulder with an overlapped relation thereto and located at the other end of the passage, said concave face of the second-mentioned enlargement gradually merging into certain vertical walls of the neck, said upwardly and inwardly inclined face of the second-named enlargement having a transverse curvature to permit the latter-named face to merge gradually into certain vertical walls of the body, certain of said faces of the enlargements and the shoulders coacting in forming the passage of segmental shape in cross section.

2. A milk bottle including a body and a neck, defined by a bottom wall and vertical walls, an enlargement formed on certain of said vertical walls interiorly of the body and a portion of the neck, a second enlargement formed on the other walls of the body and neck and arranged opposite the first enlargement and coacting therewith in defining upper and lower chambers connected by an upwardly inclined passage, said first-mentioned enlargement having a vertical face and an upwardly and outwardly inclined face, said faces merging in defining a shoulder at the lower end of the passage, said second-mentioned enlargement having an upwardly and inwardly inclined face and a concave face, said faces of the second-named enlargement merging with each other to define a second shoulder located in a plane above the first shoulder with overlapping spaced relation thereto and located at the other end of the passage, said concave face of the second-mentioned enlargement forming an outwardly flaring pouring wall on the interior of the neck and extending from the upper end of the passage to the free edge of said neck.

LELAND A. GAMMILL.